Patented Apr. 10, 1928.

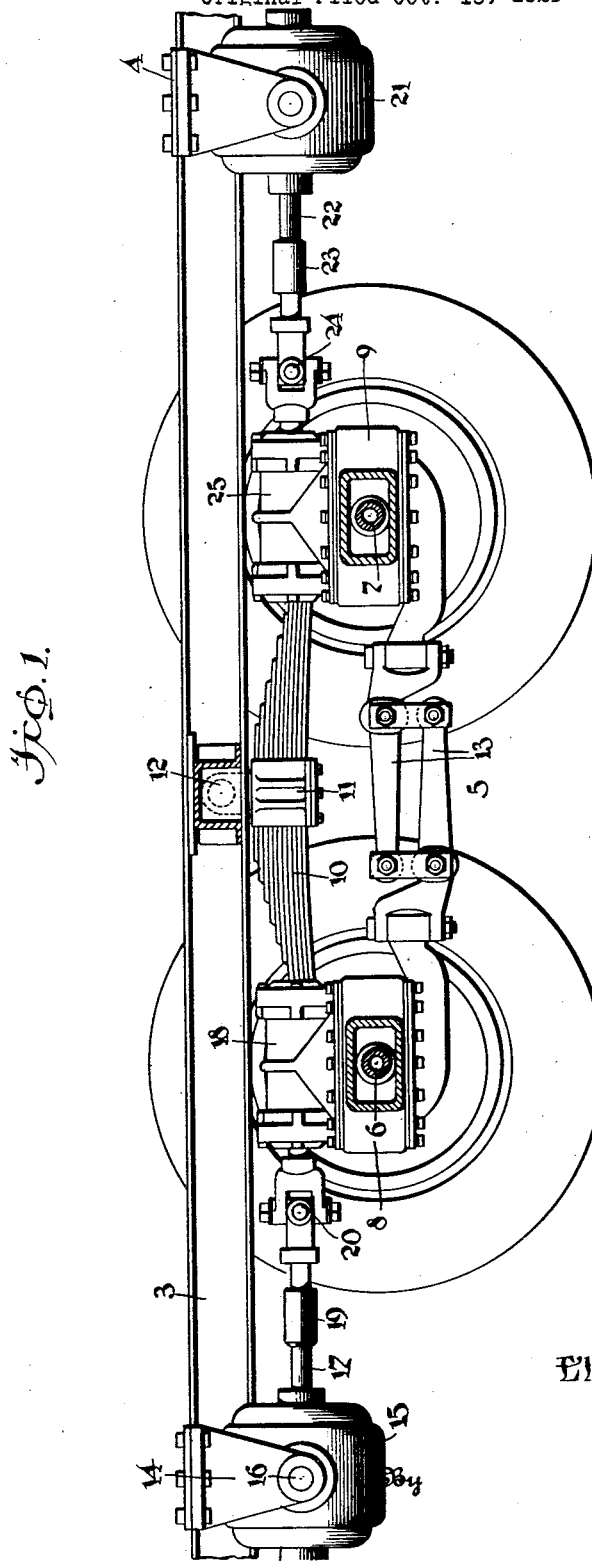

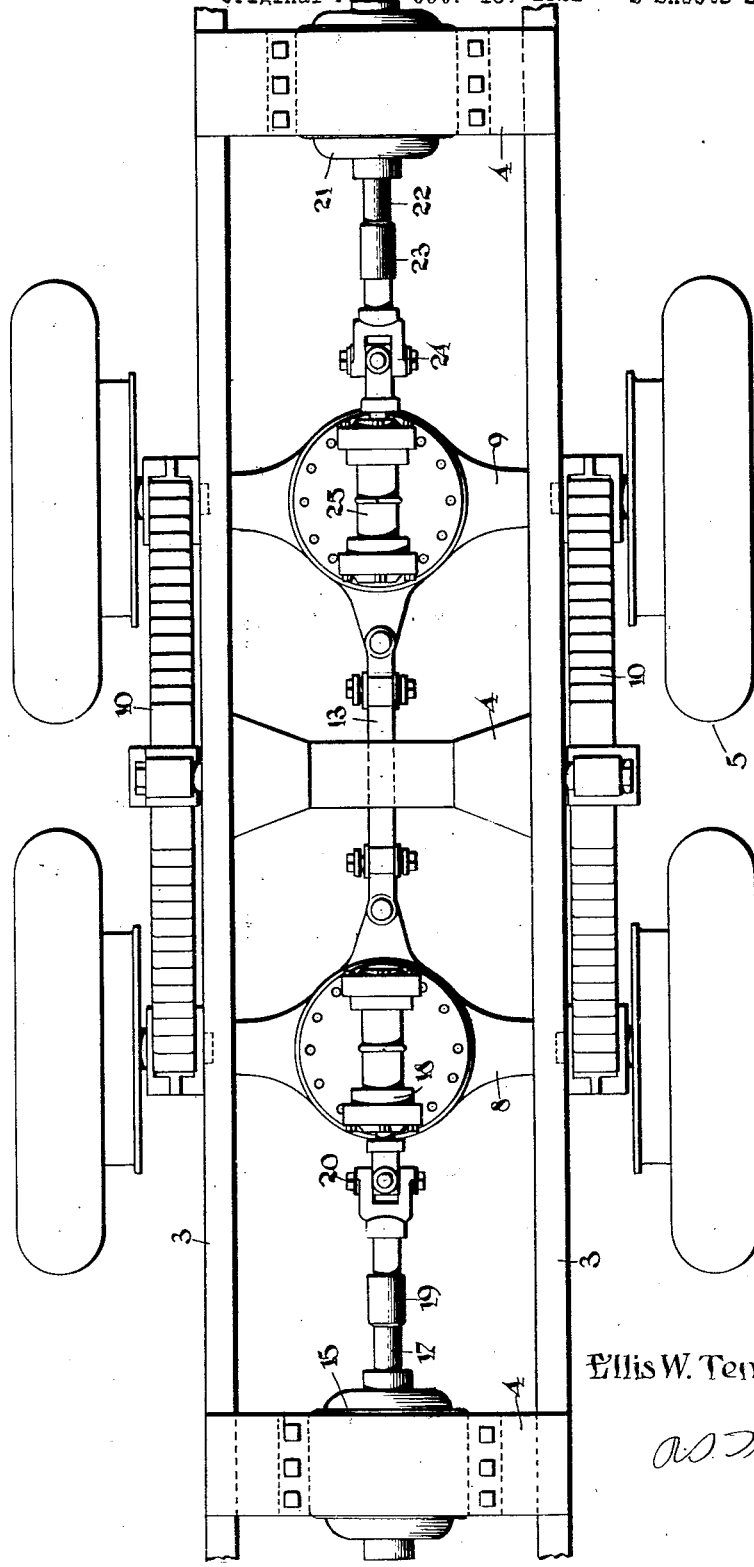

1,665,865

UNITED STATES PATENT OFFICE.

ELLIS W. TEMPLIN, OF PHILADELPHIA, PENNSYLVANIA, ASSIGNOR TO THE GOODYEAR TIRE & RUBBER COMPANY, OF AKRON, OHIO, A CORPORATION OF OHIO.

MOTOR-VEHICLE-DRIVING MECHANISM.

Original application filed October 19, 1921, Serial No. 508,844. Divided and this application filed November 9, 1925. Serial No. 67,928.

My invention relates to motor vehicles, and it has particular relation to the wheel driving mechanism thereof. More specifically it relates to a means for independently driving the individual driving axles of motor vehicles employing a plurality of driving axles.

My present invention is a division of my co-pending application Serial No. 508,844, filed Oct. 19, 1921, which matured into Patent No. 1,565,527 on Dec. 15, 1925.

The object of my invention consists in providing an electrically operated motor vehicle, in which power is transmitted from motors mounted on the main frame of the chassis to relatively movable axle shafts without interfering with the flexibility of the mounting thereof.

For a better understanding of my invention, reference may now be had to the accompanying drawings, of which;

Fig. 1 is a side view, partially in section, and partially in elevation, of the rear or trailing end of a motor truck constructed in accordance with my invention; and Fig. 2 is a plan view of the structure illustrated in Fig. 1.

Referring in detail to the drawings, I have illustrated a motor truck comprising two spaced main side frames 3, interconnected by means of transversely extending bracing members 4. Adjacent the rear end of the motor vehicle is a power truck 5 which comprises a leading driving axle 6 and a trailing driving axle 7, together with their associated housings 8 and 9, respectively, which are freely mounted thereon. The two housings 8 and 9 are interconnected at each end by means of an extensible arcuate leaf spring 10 which is directly pivotally connected thereto in such manner that when the spring 10 is flexed, by a load on the truck, the spring ends 10 move apart, thus moving the housings 8 and 9 in opposite directions. The truck 5 is secured to the main frame 3 by means of spring clips 11, which embrace the central portion of the leaf spring 10, and are pivotally secured to the frames 3 by means of the pintles 12.

The housings 8 and 9 are also connected together by means of a torque neutralizing device 13, as described in detail in my previously mentioned co-pending application, which permits of relative separational movement of the two housings, but prevents rotation of the housings about their driving axles, causing the torque of one housing to oppose that of the other.

Mounted upon the transversely extending bracing members 4 in front of the housing 8 is a supporting frame 14 upon which is pivotally mounted an electrical motor 15 by means of studs or pintles 16. The motor 15 is provided with a rotatable shaft 17 which is connected to a worm and gear speed reducing mechanism 18 integral with the housing 8. The shaft 17 is provided with a splined sleeve portion 19 which renders it extensible, and a universal joint 20 which permits of relative changes in angularity of the housing 8 and the motor 15 without interfering with the driving connection therebetween.

In like manner a motor 21 is pivotally mounted upon a transversely extending frame member 4 to drive the axle 7 by means of a shaft 22, a telescopic splined sleeve member 23, a universal joint 24, and a worm and gear drive mechanism 25.

It will be apparent from the foregoing description that any separational movement of the housings 8 and 9 will not interfere with the driving connection of the motors by reason of the inclusion of the telescopic splined sleeve connections in the motor driving shafts. In like manner, a change in angularity of the housings 8 and 9 will be accommodated by the universal joint in the driving shaft and the pivotal mounting of the motor without interfering with the proper driving thereof, and without interfering with the flexibility of the mounting of the housing.

It is apparent, of course, that the motors 15 and 21 are ordinarily intended to be operated in unison, but may, if desired, be operated separately, the power therefor being derived from any suitable source, such for example as either a storage battery mounted upon the vehicle, or a motor driven generator mounted thereon.

Although I have illustrated but one form of my invention and have described in detail but a single application thereof, it will be apparent to those skilled in the art that it is not so limited but that various minor modifications and changes may be made therein without departing from the spirit of my invention or from the scope of the appended claims.

What I claim is:

1. In a motor vehicle chassis, a main frame, a truck resiliently mounted on said frame comprising two spaced driving axles each having driving wheels mounted thereon, a motor pivotally mounted on said frame on each side of said truck, each of said motors being operatively connected to the adjacent drive axle.

2. In a motor vehicle chassis, a main frame, a truck resiliently mounted on said frame comprising two spaced driving axles each having driving wheels mounted thereon, an electrical motor pivotally mounted on said frame on each side of said truck, and means connecting each motor to the adjacent driving axle comprising a universal joint.

3. In a motor vehicle chassis, a main frame, a truck resiliently mounted on said frame comprising two relatively laterally movable driving axles, an electrical motor pivotally mounted on said frame on each side of said truck, and means connecting each motor to the adjacent driving axle comprising a universal joint and an extensible drive shaft.

4. In a motor vehicle chassis, a main frame, two spaced driving shafts each provided with a housing, a longitudinally extensible spring member secured at its intermediate portion to said frame and having said axle housings mounted directly on the ends thereof, two electrical motors pivotally mounted on the main frame one on each side of the driving shafts, and means connecting each of said motors to the adjacent driving shaft comprising an extensible drive shaft, a universal joint, and a worm and gear speed reducing mechanism.

5. In a motor vehicle, a chassis, a truck element resiliently pivotally mounted thereon comprising two spaced driving axles each having driving wheels mounted thereon, a housing surrounding each of the axles, two motors pivotally mounted on the chassis one on each side of the truck element, power transmitting means connecting each of the motors to the adjacent driving axle, and torque neutralizing means interconnecting the two axle housings.

In witness whereof, I have hereunto signed my name.

ELLIS W. TEMPLIN.